United States Patent
Saghir et al.

(10) Patent No.: US 11,909,724 B2
(45) Date of Patent: *Feb. 20, 2024

(54) APPLICATION AND NETWORK SLICE SECURITY PROFILE MAPPING FOR SECURE TUNNELING

(71) Applicant: Verizon Patent and Licensing Inc., Basking Ridge, NJ (US)

(72) Inventors: Amir Saghir, Frisco, TX (US); Said Hanbaly, Prosper, TX (US); Mun Wei Low, Irving, TX (US); Nimalan Kanagasabai, Grapevine, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 94 days.

This patent is subject to a terminal disclaimer.

(21) Appl. No.: 17/736,359

(22) Filed: May 4, 2022

(65) Prior Publication Data

US 2022/0263798 A1    Aug. 18, 2022

Related U.S. Application Data

(63) Continuation of application No. 16/892,617, filed on Jun. 4, 2020, now Pat. No. 11,356,421.

(51) Int. Cl.
| | |
|---|---|
| *H04L 9/40* | (2022.01) |
| *H04L 9/06* | (2006.01) |
| *H04L 9/30* | (2006.01) |
| *H04W 76/12* | (2018.01) |
| *H04W 12/03* | (2021.01) |
| *H04W 88/16* | (2009.01) |

(52) U.S. Cl.
CPC .......... *H04L 63/029* (2013.01); *H04L 9/0631* (2013.01); *H04L 9/0643* (2013.01); *H04L 9/302* (2013.01); *H04L 9/3066* (2013.01); *H04L 63/0428* (2013.01); *H04W 12/03* (2021.01); *H04W 76/12* (2018.02); *H04L 2209/80* (2013.01); *H04W 88/16* (2013.01)

(58) Field of Classification Search
CPC .................................................... H04L 63/029
See application file for complete search history.

(56) References Cited

U.S. PATENT DOCUMENTS

| | | |
|---|---|---|
| 9,961,624 B1 | 5/2018 | Zait |
| 2011/0151831 A1 | 6/2011 | Pattabiraman |
| 2018/0191563 A1 | 7/2018 | Farmanbar et al. |
| 2019/0387401 A1 | 12/2019 | Liao et al. |

*Primary Examiner* — Simon P Kanaan

(57) ABSTRACT

A network node residing in a mobile network identifies a first network slice of the mobile network for use by a first session between a first user equipment device (UE) and a first application hosted by a first hosting device. The network node obtains a first security profile based on an identity of the first application and based on the identified first network slice, and establishes, using the obtained first security profile, a first secure tunnel between the network node and the first hosting device for transporting first data units associated with the first session between the network node and the first hosting device.

20 Claims, 11 Drawing Sheets

US 11,909,724 B2

1

APPLICATION AND NETWORK SLICE SECURITY PROFILE MAPPING FOR SECURE TUNNELING

CROSS-REFERENCE TO RELATED APPLICATION

The present application is a continuation of, and claims priority to, U.S. application Ser. No. 16/892,617 entitled "Application and Network Slice Security Profile Mapping for Secure Tunneling," filed Jun. 4, 2020, the content of which is incorporated by reference herein in its entirety.

BACKGROUND

Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. 5G mobile telecommunications networks may support more reliable, massive machine communications (e.g., machine-to-machine (M2M), Internet of Things (IoT)). Next Generation mobile networks are expected to enable a higher utilization capacity than current wireless networks, permitting a greater density of wireless users. Next Generation mobile networks are designed to increase data transfer rates, increase spectral efficiency, improve coverage, improve capacity, and reduce latency.

DETAILED DESCRIPTION OF THE PREFERRED EMBODIMENTS

Figure 1:
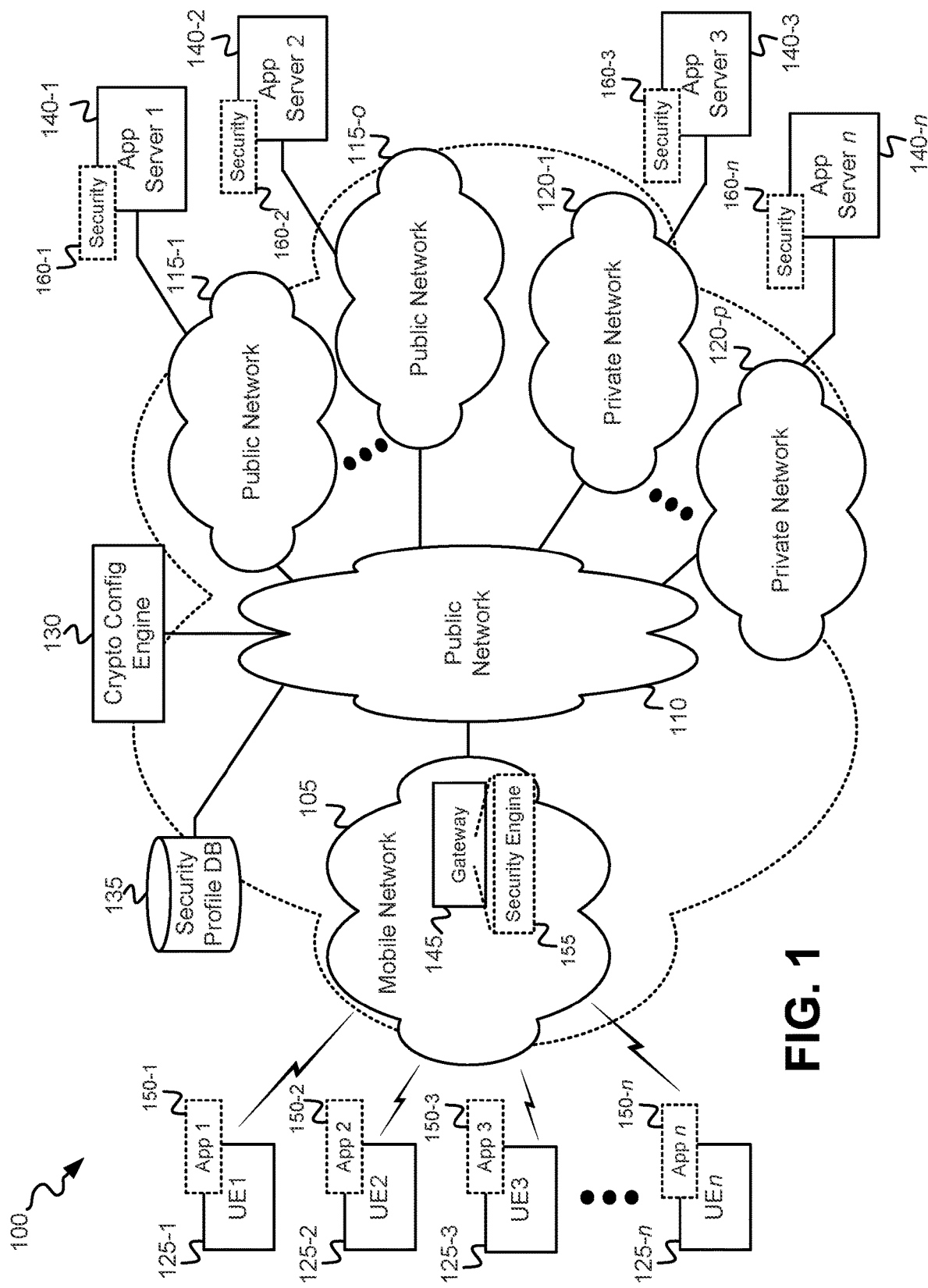
FIG. 1 illustrates an exemplary network environment in which secure tunneling is applied to packet data unit sessions involving an application executed by a user equipment device.

The following detailed description refers to the accompanying drawings. The same reference numbers in different drawings may identify the same or similar elements. The following detailed description does not limit the invention.

"Network Slicing" is a proposed innovation for implementation in Next Generation Mobile Networks. Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements associated with the particular network slice. Network slicing may be implemented in a dynamic fashion, such that the slices of the virtualized network may change over time and may be re-customized to meet new or changing needs of applications, services, devices, customers, or operators.

The "Internet of Things" (IoT) is a network of physical devices specially designed for a specific function, unlike general computing devices like a desktop or laptop computer. IoT devices are embedded with electronics and network connectivity that enable these devices to collect, store and exchange data. The network connectivity may include, for example, Bluetooth™ connectivity, Wi-Fi connectivity, and/or cellular network connectivity. An IoT object or device may additionally have computational capability, with various installed software, and may also include various types of sensors. An IoT device may be, via the network connectivity, controlled remotely across existing network infrastructure. An IoT device may use the network connectivity to communicate with other IoT devices, or with certain nodes (e.g., a particular server or computer) across a public network such as the Internet.

Low-cost, or small form factor, IoT devices are typically not able to support enhanced encryption and data integrity protection mechanisms that ensure end-to-end security for applications executed by the IoT devices. 5G networks are intended to permit network service to IoT devices on a massive scale. Furthermore, in enterprise environments, there are certain applications that require secure links to ensure that data transport is protected. Traffic between a physically secure enterprise premise and an application platform may traverse a public network (e.g., the Internet, a public network) and may be compromised during transport across the public network.

Exemplary embodiments described herein enable the establishment of a secure transport tunnel or link between a gateway of the mobile network and an application hosting server(s). The tunnel may be provisioned across public networks based on a particular application and a network slice being used to handle the traffic for a given user equipment device (referred herein as a "UE") and the particular application. In some implementations, an application ID associated with the application and a network slice number associated with the slice may be mapped to a security profile. The security profile may, for example, include a selected security level for the secure tunnel, a digital certificate or encryption key, and an identifier associated with the user equipment device. A network operator; an owner, operator, or administrator of an application hosting device; or an owner, operator, and/or an administrator of the user equipment device may configure the security profile with a particular level and type of security service for traffic that traverses the secure tunnel or link. The selected security profile may be used to determine a security service (e.g., an encryption algorithm) to implement for providing security for the transport of session data between a UE and the application server. For example, in some implementations, a high, medium, or low level of security may be selected for a particular security profile and a corresponding level of encryption may be applied to establish a secure tunnel between the UE and the application server across the public network.

FIG. 1 illustrates an exemplary network environment 100 in which secure tunneling is applied to Packet Data Unit (PDU) sessions involving an application executed by a UE based on an application identifier (ID) of the application and a network slice number assigned to sessions involving the UE within a mobile network. Network environment 100 may include a mobile network 105, a public network 110, one or more public networks 115-1 through 115-o, one or more private networks 120-1 through 120-p, UEs 125-1 through 125-n, a cryptographic (crypto) configuration engine 130, a security profile database (DB) 135, and application servers 140-1 through 140-n.

Mobile network 105 includes any type of a Public Land Mobile Network (PLMN), such as a Next Generation PLMN (e.g., Fifth Generation (5G)), that may implement network slicing. As shown, mobile network 105 includes at least one gateway 145, among other network nodes/devices that are not shown for purposes of simplicity. Gateway 145 may include one or more network devices that execute a security engine 155. Security engine 155 may, among other functions, tunnel data between UEs 125 and app servers 140 via secure transport tunnels that are established based on security profiles supplied by crypto configuration engine 130, as described below in further detail.

Public network 110 may include any type of network that is accessible to the general public. In some implementations, public network 110 may include a packet data network that uses, for example, Internet Protocol (IP) for transporting data. Public network 110, however, may use other types of packet switching protocols. In one exemplary implementation, public network 110 may include the Internet.

Public networks 115-1 through 115-o (generically referred to herein as "public networks 115" or "public network 115") may each include any type of network that performs data transport, is accessible to the general public, and is connected to public network 110 via a wired or wireless connection. In some embodiments, public network 110 and one or more of public networks 115-1 through 115-o may be a same public network (e.g., the Internet). In other embodiments, one or more of public networks 115 may include a cloud networking environment, that connects to public network 110, and which may be implemented within a software-defined computer network within a cloud computing infrastructure. External devices (e.g., UEs 125) may use the public networks 115 to communicate with app servers 140-1 and 140-2, and vice versa.

Private networks 120-1 through 120-p (generically referred to herein as "private networks 115" or "private networks 115") may each include any type of network that performs data transport, has restricted access to the general public, and is connected to public network 110 (e.g., the Internet) via a wired or wireless connection. In certain embodiments, private networks 120 may each include a restricted access cloud networking environment that may be implemented within a software-defined computer network within a cloud computing infrastructure. External devices (e.g., UEs 125) may use private networks 120 to communicate with app servers 140-3 and 140-n, and vice versa.

UEs 125-1 through 125-n (generically referred to herein as "UEs 125" or "UE 125") may each include any type of computational device that communicates via a network(s) of network environment 100. UEs 125 may each include, for example, a cellular phone (e.g., a "smart" phone), a Voice over Internet Protocol (VoIP) phone, a computer (e.g., desktop, laptop, tablet, or wearable computer), a smart Television (TV), an audio speaker (e.g., a "smart" speaker), a video gaming device, a music player (e.g., a digital audio player), a digital camera, a set-top box (STB), or a "Machine-to-Machine" (M2M) or "Internet of Things" (IoT) device. A "user" (not shown) may own, operate, administer, and/or carry each UE 125. A user may alternatively be referred to herein as a "customer" or a "subscriber." As shown, each UE 125 may execute an application 150 that may engage in a PDU session with a corresponding app server 140 across mobile network 105, public network 110, and possibly a public network 115 or a private network 120.

Crypto configuration engine 130 includes one or more network devices that implement functionality which enables customers to customize the security level for secure transport tunneling for their UEs, where each security level is based on: 1) an ID associated with a given UE, 2) the application that originates the data which is transported, and 3) the particular network slice of the mobile network via which the data is transported.

Security profile DB 135 includes one or more network devices that further include memory devices for storing a database of security profiles. Security profile DB 135 may store multiple security profiles associated with a given UE, a given application, and a given network slice of mobile network 105. One exemplary implementation of security profile DB 135 is described below with respect to FIG. 5.

App servers 140-1 through 140-n each include one or more network devices that host certain applications that may engage in PDU sessions with other apps 150 installed and executed at UEs 125. App servers 140 may each connect to a public network 115 or a private network 120 as shown in FIG. 1. Though not shown in FIG. 1, app servers 140 may alternatively connect directly with public network 110 instead of via a public network 115 or private network 120. In embodiments in which public networks 115 or private networks are implemented within a software-defined computer network within a cloud computing infrastructure, app servers 140 may be implemented as software entities within the cloud computing infrastructure. In such embodiments, external devices, such as UEs 125, may access application services provided by app servers 140-1 through 140-n via the cloud computing infrastructure of public networks 115 or private networks 120.

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1.

Figure 2:
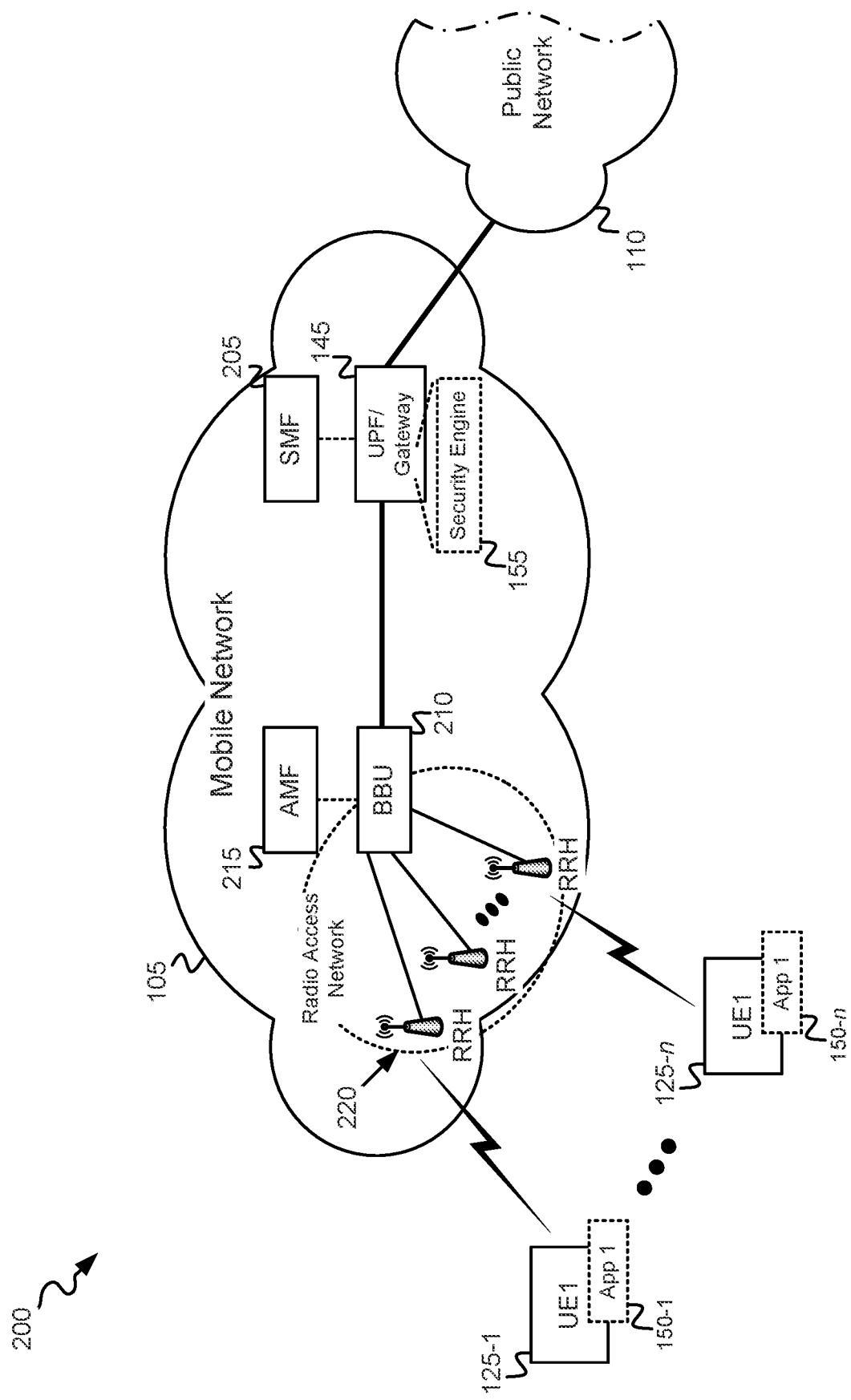
FIG. 2 depicts a portion of the network environment of FIG. 1 that includes the mobile network and a public network.

FIG. 2 depicts an exemplary implementation of a portion 200 of the network environment 100 of FIG. 1 which includes mobile network 105 and public network 110. In the exemplary implementation shown, mobile network 105 may include a 5G mobile network that includes 5G network components. For example, mobile network 105 may include a User Plane Function (UPF) 145, a Session Management Function (SMF) 205, an Access Management Function (AMF) 215, and a Radio Access Network 220. UPF 145 may correspond to gateway 145 depicted in FIG. 1.

UPF 145 may include a network device that acts as a router and a gateway between mobile network 105 and the public network 110. UPF 145 may forward session data received from the public network 110 to a base band unit in the RAN 220 (which, in turn, transmits the session data to a destination UE 125). Additionally, UPF 145 may forward session data received from a UE 125, via a base band unit in the RAN 220, to a destination connected directly or indirectly to public network 110 (e.g., an app server 140). Though only a single UPF 145 is shown, mobile network 105 may include multiple UPFs 145 disposed at various locations in mobile network 105. SMF function 205 may include a network device that performs session management and selects and controls the UPF 145 for data transfer. AMF function may include a network device that performs UE-based authentication, authorization, and mobility management for UEs 125.

RAN 220 may include a base band unit (BBU) 210 and multiple remote radio heads (RRHs). RAN 220 may also include one or more additional base band units (BBUs) and RRHs, and other wireless nodes and components, not shown in FIG. 2. BBU 210 may connect to the multiple RRHs via, for example, optical fibers. BBU 210 includes a network device that operates as a digital function unit that transmits digital baseband signals to the multiple RRHs, and receives digital baseband signals from the multiple RRHs. If BBU 210 is connected to the multiple RRHs via, for example, optical fibers, then BBU 210 may convert the digital baseband signals into corresponding optical signals for transmission to the RRHs, and may receive optical signals from the RRHs and convert the optical signals into corresponding digital baseband signals.

The RRHs include network devices that operate as radio function units which transmit and receive radio frequency (RF) signals to/from UEs 125. If the RRHs are connected to BBU 210 via an optical fiber, the RRHs may convert received RF signals to optical signals and transmit the optical signals to BBU 210. Additionally, the RRHs may receive optical signals from BBU 210 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UEs 125, and to transmit wireless RF signals to UEs 125. BBU 210 and a RRH may represent a distributed Next Generation NodeB, which may also be referred to as a "gNB," or an enhanced LTE (eLTE) eNB that can connect to mobile network 105.

Figure 3:
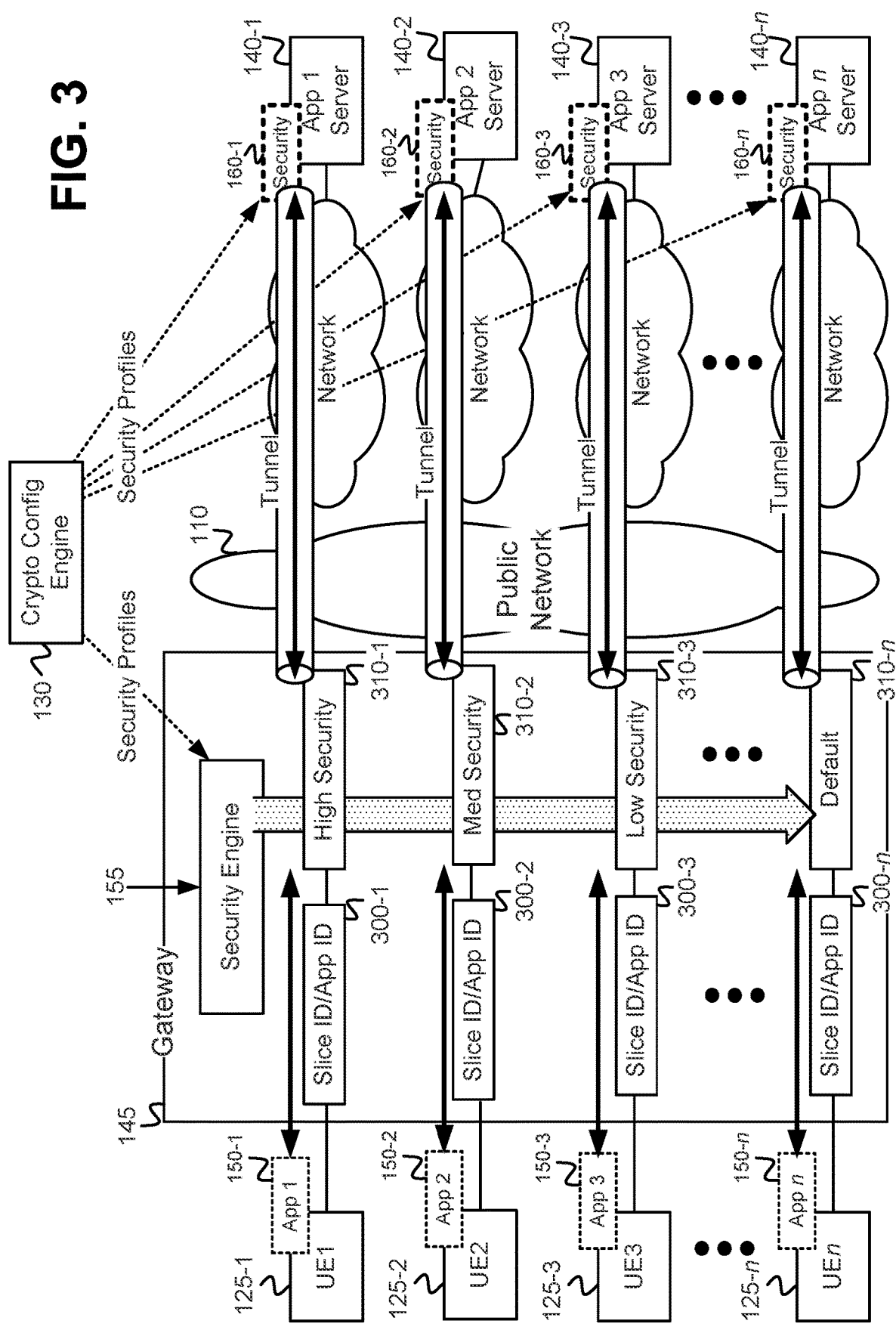
FIG. 3 illustrates an example of the secure tunneling of data traffic, by a mobile network gateway, between session endpoints using a customized security level that is based on a mapping between mobile network slice identifiers and application identifiers.

FIG. 3 illustrates an example of the secure tunneling of data traffic, by a gateway 145 (e.g., a mobile network gateway), between session endpoints using a customer-selected security level that is based on a mapping between mobile network slice identifiers and application identifiers. The session endpoints shown in FIG. 3 include UEs 125 and app servers 140, and the secure tunneling for PDU sessions between the session endpoints occurs between the gateway 145 in mobile network 105 and a destination endpoint (e.g., an app server 140) connected directly or indirectly to a public network, such as public network 110. The secure tunneling, therefore, secures the data of the session as it is transported across the public network (e.g., the Internet 110) between the session endpoint UEs 125 and app servers 140.

Prior to establishment of a secure tunnel for a session, as described herein, crypto configuration engine 130 supplies customized security profiles to security engine 155 of gateway 145 and to session endpoint app servers 140-1 through 140-*n*. A network operator, an operator or administrator of an application hosting device (e.g., an app server 140), or a user of a UE 125, selects a security level for a UE application 150 that is to engage in a PDU session, and crypto configuration engine 130 then generates a security profile for the UE 125. The security profile includes, for example, a UE identifier (ID), an app ID for the application, a digital certificate or cryptographic key, and an indication of the selected security level. Crypto configuration engine 130 sends the security profile to security engine 155 at gateway 145 and to a respective app server 140 that hosts the particular application associated with the app ID contained in the security profile.

Upon the subsequent initiation of a session from a UE 125, security engine 155 of gateway 145 identifies the network slice ID (e.g., a network slice #) for the mobile network slice being utilized for the session between the UE 125 and the application at the endpoint app server 140, and obtains the app ID of the application involved in the session. Security engine 115 then maps the network slice ID and app ID to a particular security level for the session. The security level may, for example, be a high, medium, or low security level, with each security level being associated with a particular type of data security, authentication, and/or cryptographic algorithm. A security level (e.g., high, medium, or low security) of each data security, authentication, or cryptographic algorithm relates to a number of factors associated with the algorithm, including a size of the algorithm's encryption key, whether the algorithm includes a symmetric or asymmetric cryptographic algorithm, a type of key distribution used with the algorithm, etc.

In one example, a high security level may use Elliptic-Curve Cryptography (ECC)-P256, Rivest-Shamir-Adleman (RSA)-2048, Secure Hash Algorithm (SHA)-256, or Mutual Secure Sockets Layer (SSL) cryptographic algorithms. Other types of high security cryptographic algorithms may, however, be used (e.g., those using longer encryption key sizes than medium or low security cryptographic algorithms). As a further example, a medium security level may use RSA-1024, Advanced Encryption Standard (AES) 512, or SHA-1 cryptographic algorithms. Other types of medium security cryptographic algorithms may, however, be used (e.g., those using smaller encryption key sizes than high security level cryptographic algorithms, but larger encryption key sizes than low security level cryptographic algorithms). As another example, a low security level may use AES 126 or Message Digest algorithm 5 (MD5) cryptographic algorithms. Other types of low security cryptographic algorithms may, however, be used (e.g., with smaller encryption key sizes than high security level or medium security level cryptographic algorithms). Security engine 115 tunnels PDUs associated with the session to a session endpoint (e.g., app server 140) across the public network using a data security, authentication, and/or cryptographic algorithm associated with the selected security level for the particular network slice ID and app ID.

Referring to the example of FIG. 3, UE 125-1 may execute an app 150-1 which initiates a PDU session with app server 140-1. Upon receipt of a session request, or PDUs associated with the session, from UE 125-1, security engine 155 of gateway 145 maps the network slice ID and the app ID 300-1 to a high security level 310-1. Security engine 155 executes a data security, authentication, and/or encryption algorithm that corresponds to the selected high security level 310-1 (e.g., ECC-P256, RSA-2048, SHA-256, or Mutual SSL) and sends the PDUs of the session to the app server 140-1 (e.g., as encrypted PDU ciphertext) via the tunnel established using the security, authentication, and/or encryption algorithm. Upon receipt of the PDUs of the session at app server 140-1, security app 160-1, using the previously distributed security profile from crypto configuration engine 130, decrypts the tunneled data to recover the original PDU in plaintext form.

Similarly, as further shown in FIG. 3, UE 125-2 may execute an app 150-2 which initiates a PDU session with app server 140-2. Upon receipt of a session request, or PDUs associated with the session, from UE 125-2, security engine 155 of gateway 145 maps the network slice ID and the app ID 300-2 to a medium security level 310-2. Security engine 155 executes a data security, authentication, and/or encryption algorithm that corresponds to the selected medium security level 310-2 (e.g., RSA-1024, AES 512, SHA-1) and sends the PDUs of the session to the app server 140-2 via the tunnel established using the security, authentication, and/or encryption algorithm. Upon receipt of the PDUs of the session at app server 140-2, security app 160-2, using the previously distributed security profile from crypto configuration engine 130, decrypts the tunneled data to generate plaintext data.

As additionally shown in FIG. 3, UE 125-3 may execute an app 150-3 which initiates a PDU session with app server 140-3. Upon receipt of a session request, or PDUs associated with the session, from UE 125-3, security engine 155 of gateway 145 maps the network slice ID and the app ID 300-3 to a low security level 310-3. Security engine 155 executes a data security, authentication, and/or encryption algorithm that corresponds to the selected low security level 310-2 (e.g., AES 126 or MD5) and sends the PDUs of the session to the app server 140-3 via the tunnel established using the security, authentication, and/or encryption algorithm. Upon receipt of the PDUs of the session at app server 140-3, security app 160-3, using the previously distributed security profile from crypto configuration engine 130, decrypts the tunneled data to generate plaintext data.

Furthermore, UE 125-n may execute an app 150-n which initiates a PDU session with app server 140-n. Upon receipt of a session request, or PDUs associated with the session, from UE 125-n, security engine 155 of gateway 145 maps the network slice ID and the app ID 300-n to a default security level 310-n. The default security level may include a selected security level for any circumstance where, for example, a security level is missing from the security profile or where the customer of UE 125-n has left the selection of a security level up to the operator of mobile network 105. Security engine 155 executes a data security, authentication, and/or encryption algorithm that corresponds to the default security level 310-n and sends the PDUs of the session to the app server 140-n via the tunnel established using the security, authentication, and/or encryption algorithm. Upon receipt of the PDUs of the session at app server 140-n, security app 160-n, using the previously distributed security profile from crypto configuration engine 130, decrypts the tunneled data to generate plaintext data.

Figure 4:
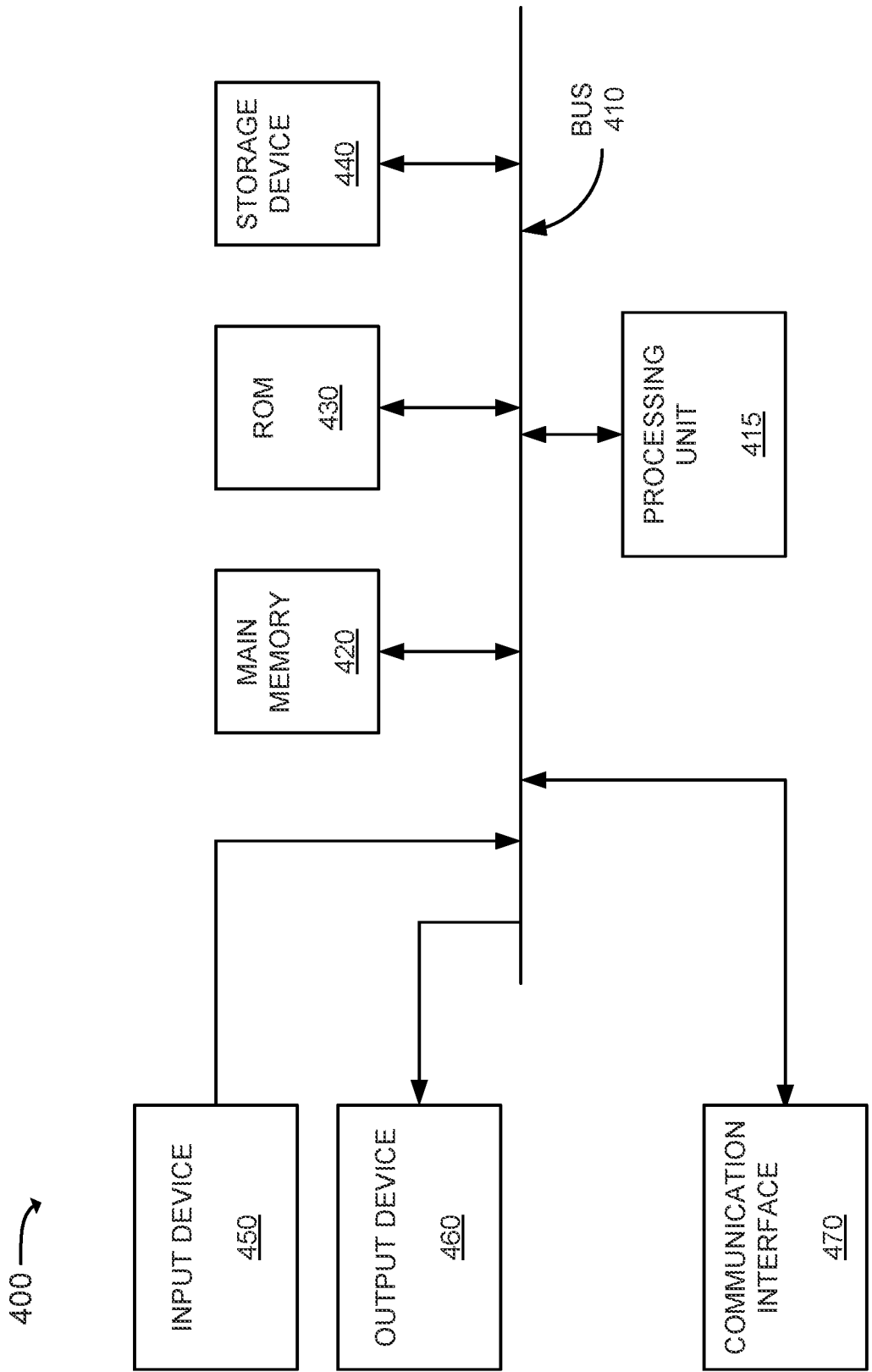
FIG. 4 is a diagram of exemplary components of a network device.

FIG. 4 is a diagram of exemplary components of a network device 400. UEs 125, gateway 145, crypto configuration engine 130, security profile DB 135, and app servers 140 may each include, or be implemented on, one or more network devices that are configured with a same, or similar, components to those of network device 400. Network device 400 may include a bus 410, a processing unit 415, a main memory 420, a read only memory (ROM) 430, a storage device 440, an input device 450, an output device 460, and a communication interface(s) 470. Bus 410 may include a path that permits communication among the elements of network device 400.

Processing unit 415 may include one or more processors or microprocessors which may interpret and execute stored instructions associated with one or more processes, or processing logic that implements the one or more processes. In some implementations, processing unit 415 may include programmable logic such as Field Programmable Gate Arrays (FPGAs) or accelerators. Processing unit 415 may include software, hardware, or a combination of software and hardware for executing the processes described herein. Main memory 420 may include a random access memory (RAM) or another type of dynamic storage device that may store information and, in some implementations, instructions for execution by processing unit 415. ROM 430 may include a Read Only Memory (ROM) device or another type of static storage device (e.g., Electrically Erasable Programmable ROM (EEPROM)) that may store static information and, in some implementations, instructions for use by processing unit 415. Storage device 440 may include a magnetic and/or optical recording medium and its corresponding drive. Main memory 420, ROM 430 and storage device 440 may each be referred to herein as a "non-transitory computer-readable medium" or a "non-transitory storage medium."

Input device 450 may include one or more devices that permit a user or operator to input information to network device 400, such as, for example, a keypad or a keyboard, a display with a touch sensitive panel, voice recognition and/or biometric mechanisms, etc. Output device 460 may include one or more devices that output information to the operator or user, including a display, a speaker, etc. Input device 450 and output device 460 may, in some implementations, be implemented as a graphical user interface (GUI) that displays GUI information and which receives user input via the GUI. In some implementations, such as when network device 400 is a gateway 145 or security profile DB 135, input device 450 and/or output device 460 may be omitted from network device 400.

Communication interface 470 may include one or more transceivers that enable network device 400 to communicate with other devices and/or systems. For example, in the case of a UE 125, communication interface 470 may include a wireless transceiver (including at least one antenna) for communicating with one or more RRHs of RAN 220. In the cases of gateway 145, security profile DB, crypto configuration engine 130, and app servers 140, communication interface 470 may include at least one wired transceiver for wired communication via mobile network 105, public network 110, public networks 115, or private networks 120.

Network device 400 may perform certain operations or processes, as may be described herein. Network device 400 may perform these operations in response to processing unit 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into main memory 420 from another computer-readable medium, such as storage device 440, or from another device via communication interface 470. The software instructions contained in main memory 420 may cause processing unit 415 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 400 illustrated in FIG. 4 is for illustrative purposes. Other configurations may be implemented. Therefore, network device 400 may include additional, fewer and/or different components, arranged in a different configuration, than depicted in FIG. 4.

Figure 5:
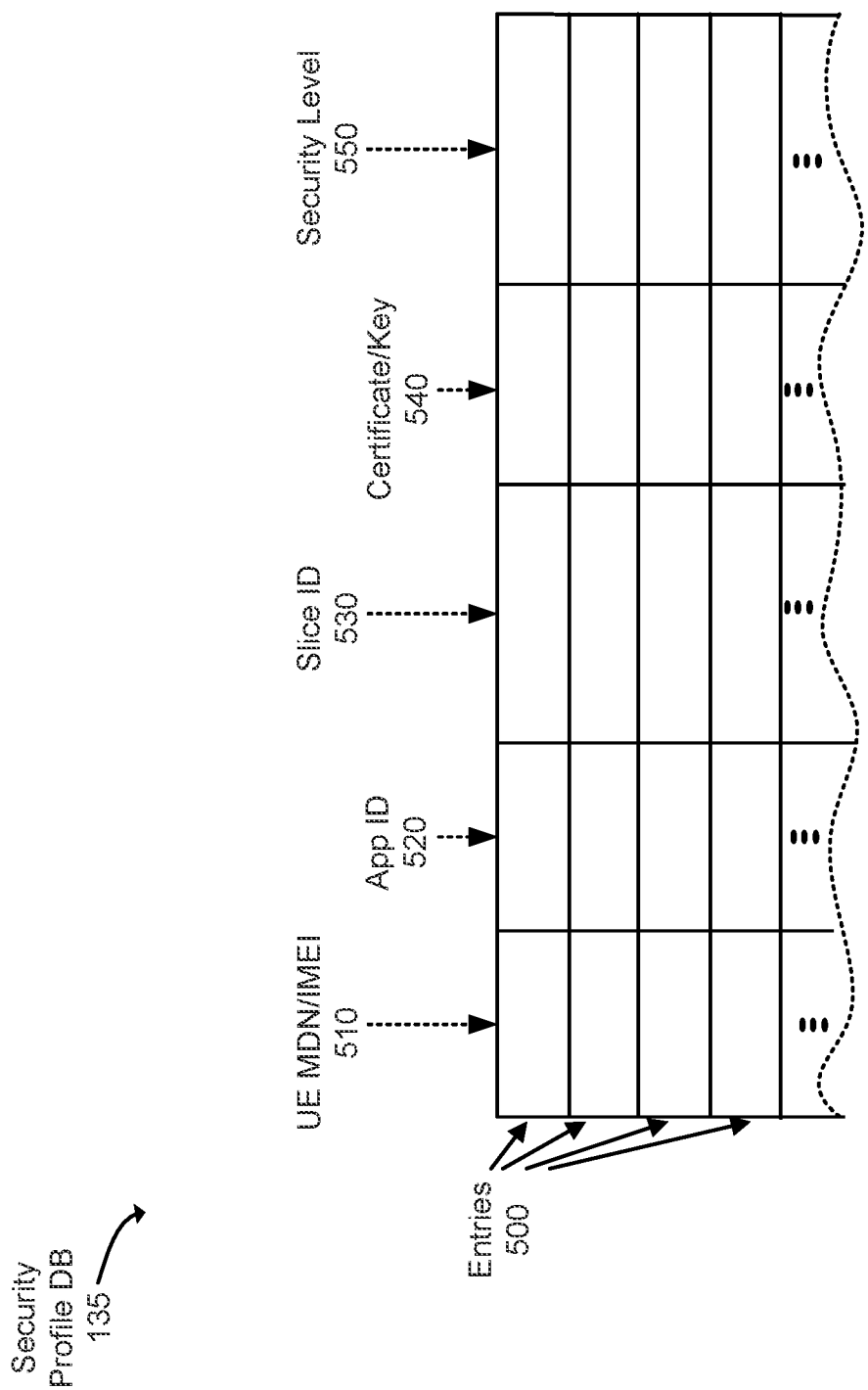
FIG. 5 depicts an exemplary implementation of a data structure for data that may be stored in the security profile database of FIG. 1.

FIG. 5 depicts an exemplary implementation of a data structure that may be stored in security profile DB 135. As shown, the data structure may include multiple entries 500, with each entry 500 including, for example, a UE Mobile Directly Number (MDN)/International Mobile Equipment Identity (IMEI) field 510, an app ID field 520, a slice ID field 530, a certificate/key field 540, and a security level field 550.

UE MDN/IMEI field 510 stores data that identifies a MDN and/or IMEI of a particular UE 125. App ID field 520 stores data that indicates a unique ID associated with an application installed and executed at the UE 125 identified in field 510 of the entry 500. The executing application may generate data, for a PDU session, which is transported via a secure tunnel from mobile network 105 to a destination endpoint app server 140 across the public network. Slice ID field 530 stores data that identifies a particular network slice, within mobile network 105, over which the PDU session from the application identified in field 520 is transported.

Certificate/key field 540 stores a digital certificate and/or cryptographic key for use by security engine 155 at gateway 145, and by a security app 160 at an app server 140, with a data security, authentication, and/or cryptographic algorithm. Security level field 550 stores data that indicates a security level, among multiple different security levels, selected by a customer for the UE 125 identified in field 510 of the entry 500.

To locate a particular entry 500, security profile DB 135 may be queried with particular data to locate an entry 500 having matching data stored in a particular one of the fields 510, 520, 530, 540 and/or 550. When such an entry 500 is located, data may be stored in one or more fields of the entry 500, or data may be retrieved from one or more fields of the entry 500. For example, if the MDN or IMEI of a particular UE 125, an app ID of an application 150 at the UE 125, and a network slice number of mobile network 105 that is currently serving the UE 125 are known, then the entries 500 of security profile DB 135 may be queried to locate an entry 500 having a matching MDN or IMEI in field 510, a matching app ID in field 520, and a matching network slice number in field 530. Upon location of the entry 500 with matching fields 510, 520 and 530, a security level may be retrieved from security level field 550 and a certificate or key may be retrieved from field 540.

Security profile DB 135 of FIG. 5 is depicted as including a tabular data structure with a certain number of fields having certain content. The tabular data structure shown in FIG. 5, however, is for illustrative purposes. Other types of data structures may alternatively be used. The number, types, and content of the entries and/or fields in the data structures illustrated in FIG. 5 are also for illustrative purposes. Other data structures having different numbers of, types of and/or content of, the entries and/or the fields may be implemented. Therefore, the data structure depicted in FIG. 5 may include additional, fewer and/or different entries and/or fields than those shown.

Figure 6:
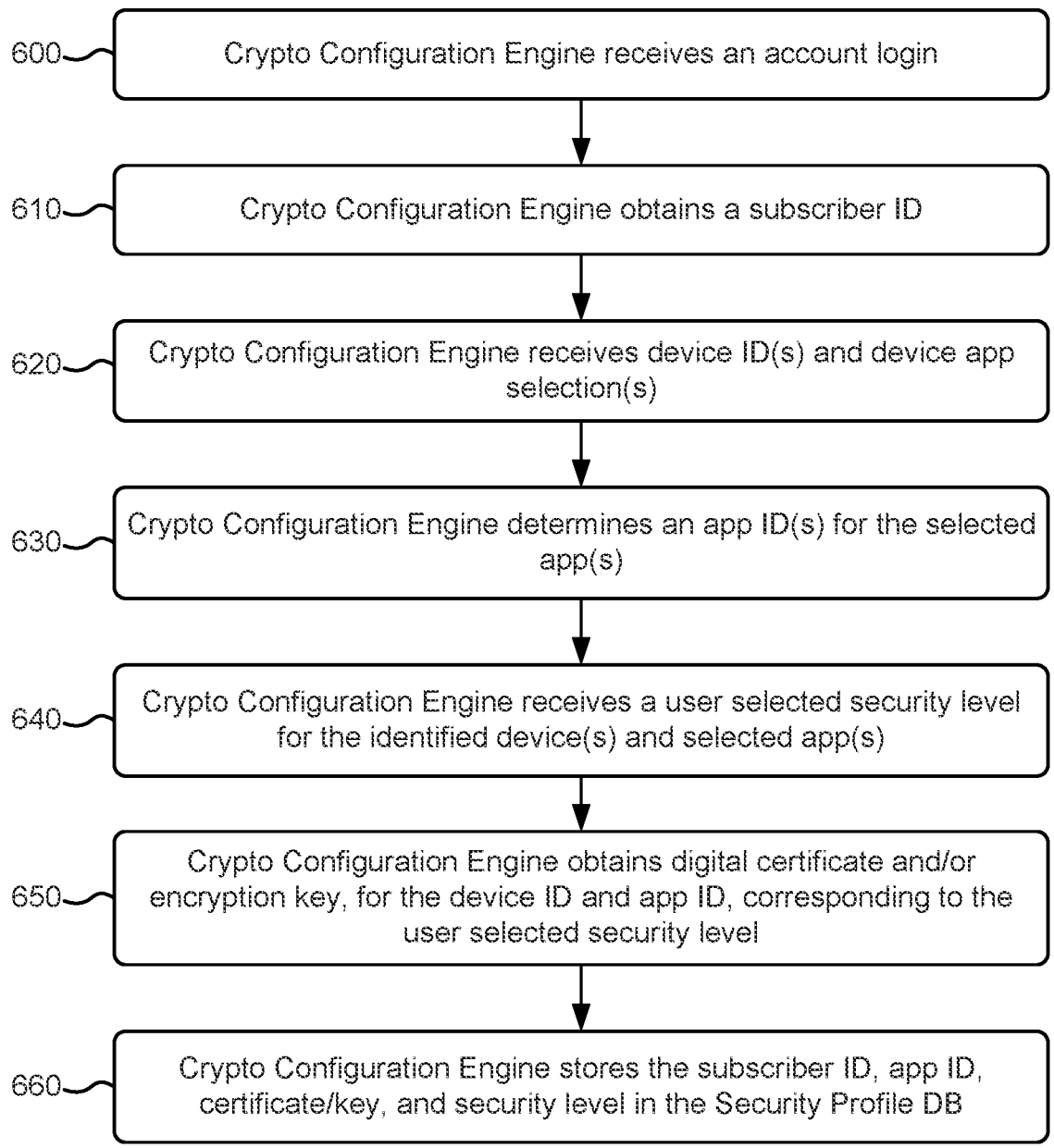
FIG. 6 is a flow diagram of an exemplary process for selection of a particular security level, from multiple security levels, to be applied to packet data unit sessions involving a particular application and user equipment device.

FIG. 6 is a flow diagram of an exemplary process for selection of a particular security level, from multiple security levels, to be applied to PDU sessions involving a particular app 140 at a UE 125 when data of the PDU sessions transits between mobile network 105 across a public network (e.g., the Internet 110) to a session endpoint. The exemplary process of FIG. 6 may be implemented by crypto configuration engine 130. The exemplary process of FIG. 6 is described below with reference to the exemplary user interface of FIG. 7.

The exemplary process may include crypto configuration engine 130 receiving an account login (block 600). A network operator; an owner, operator, or administrator of an application hosting device (e.g., an app server 140); or an owner, operator, and/or an administrator of a UE 125 (all generically referred to below as a "user") may send a login from a device to crypto configuration engine 130 that includes, for example, a login name and login password. The account owner may have a previously established account or may register in conjunction with the current login. Crypto configuration engine 130 then verifies that the login for the account is correct.

Figure 7:
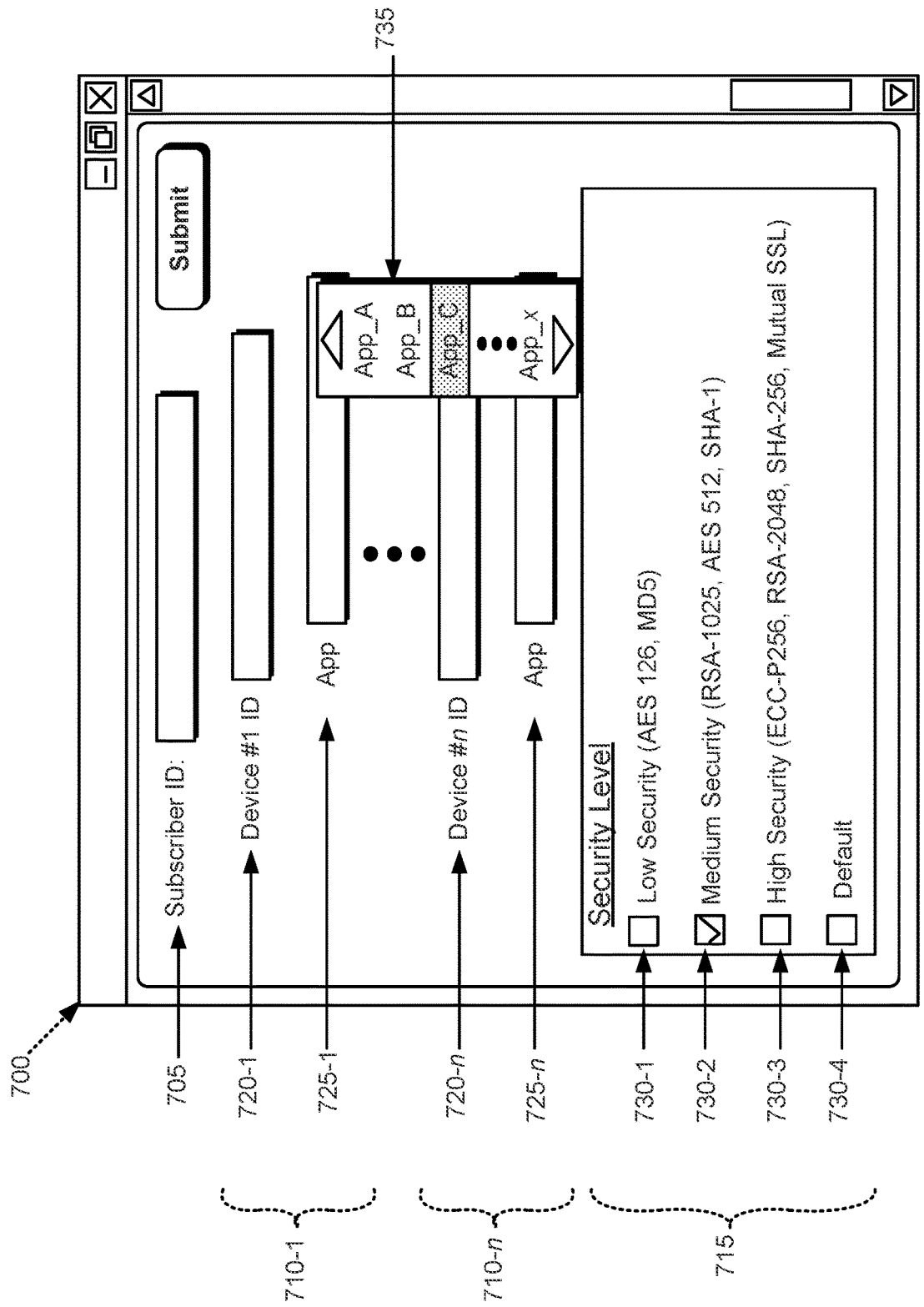
FIG. 7 illustrates an exemplary user interface associated with the process of FIG. 6.

Crypto configuration engine 130 may obtain a subscriber ID associated with one or more UEs 125 (block 610). FIG. 7 illustrates an exemplary user interface 700 that may be implemented by a device, such as a UE 125. In one embodiment, the user interface 700 may be implemented by an account access application installed at, and executed by, a UE 125. In another embodiment, the user interface 700 may be implemented as a webpage (e.g., a hypertext markup language (HTML) document) accessed by a web browser application installed at a UE 125. As shown, user interface 700 may include a subscriber ID entry field 705 into which the user may enter a unique subscriber identifier associated with one or more UEs 125. In one implementation, the subscriber ID may include an account number associated with a subscriber that owns, operates, and/or administers at least one UE 125.

Crypto configuration engine 130 receives a device ID(s) and device app selection(s) (block 620), and determines an app ID(s) for the selected app(s) (block 630). The user interface 700 of FIG. 7 includes n sections 710-1 through 710-n for entering device ID and application ID information for n different UEs 125 that are owned, operated, and/or administered by the subscriber identified in entry field 705. User interface 700 may, thus, enable the entry of multiple different UEs 125, and associated applications, and to select a security level for protecting the data of PDU sessions involving those UEs/applications.

In a first section 710-1 of user interface 700, a phone number (e.g., a MDN and/or IMEI) associated with a first UE 125 may be entered into the device ID entry field 725-1. Further, a drop-down menu 735 may be displayed, in association with an application entry field 730-1, that may be used to select an application that is installed at the device identified in field 725-1 and that may be used during a PDU session. The drop-down menu 735 displays the names of numerous different applications, and the user may scroll through the displayed application names of menu 735 to identify a particular application installed at the UE 125 identified in entry field 725-1. Upon selection of the particular application from the drop-down menu 735, crypto configuration engine 130 obtains an application ID that corresponds to the name of the user-selected application. The app ID may include a unique numeric, or alphanumeric, identifier associated with the particular application installed at the UE 125.

In an nth section 710-n of user interface 700, a phone number (e.g., a MDN and/or IMEI), associated with an nth UE 125 of the subscriber, may be entered into the device ID entry field 725-n. Further, a drop-down menu (i.e., similar to menu 735) may be displayed, in association with an application entry field 730-n, that may be used to select an application installed at the device identified in field 725-n and to be used during a PDU session. The drop-down menu displays the names of numerous different applications, and the user may scroll through the displayed application names of the menu to identify a particular application installed at the UE 125 identified in entry field 725-n. Upon selection of the particular application from the drop-down menu, crypto configuration engine 130 obtains an application ID that corresponds to the name of the user-selected application.

Crypto configuration engine 130 receives a user selected security level for the identified device(s) and the selected app(s) (block 640). The user interface 700 of FIG. 7 includes a section 715 that enables the user to select and customize a level of transport security applied to the PDU sessions of the applications and devices entered in entry fields 720 and 725. In one implementation, user interface 700 enables the user to select from four different levels of security: low security, medium security, high security, and a default security. As shown in FIG. 7, a checkbox 730-1 enables selection of low security, a checkbox 730-2 enables selection of medium security, a checkbox 730-3 enables selection of high security, and a checkbox 730-4 enables selection of a default level of transport security. In an exemplary implementation, selection of low security designates AES 126 or MD5 as the algorithm to be used for securing data of the PDU sessions; selection of medium security designates RSA-1025, AES 512, or SHA-1 as the algorithm to be used for securing data of the PDU sessions; and selection of high security designates ECC-P256, RSA-2048, SHA-256, or Mutual SSL to be used for securing data of the PDU sessions.

Crypto configuration engine 130 obtains a digital certificate and/or encryption key, for the device ID and app ID, corresponding to the user selected security level (block 650). Crypto configuration engine 130 may obtain the digital certificate, an encryption key, and/or a public/private cryptographic key pair, from a Public Key Infrastructure (PKI) certificate authority (CA). Alternatively, crypto configuration engine 130 may generate the public/private cryptographic key pair using an asymmetric cryptographic key generation algorithm. As a further alternative, crypto configuration engine 130 may generate the encryption/decryption key using a symmetric encryption key generation algorithm.

Crypto configuration engine 130 stores the subscriber ID, app ID, certificate/key, and security level in the security profile DB 135 (block 660). Referring to the example data structure of FIG. 5, an entry 500 is identified by engine 130 for storage, and the subscriber ID (e.g., the UE 125's MDN/IMEI) obtained in block 610 is stored in field 510, the application ID determined in block 630 is stored in field 520, the digital certificate and/or encryption key obtained in block 650 is stored in field 540, and the security level selected in block 640 is stored in field 550 of the identified entry 500.

Figure 8:
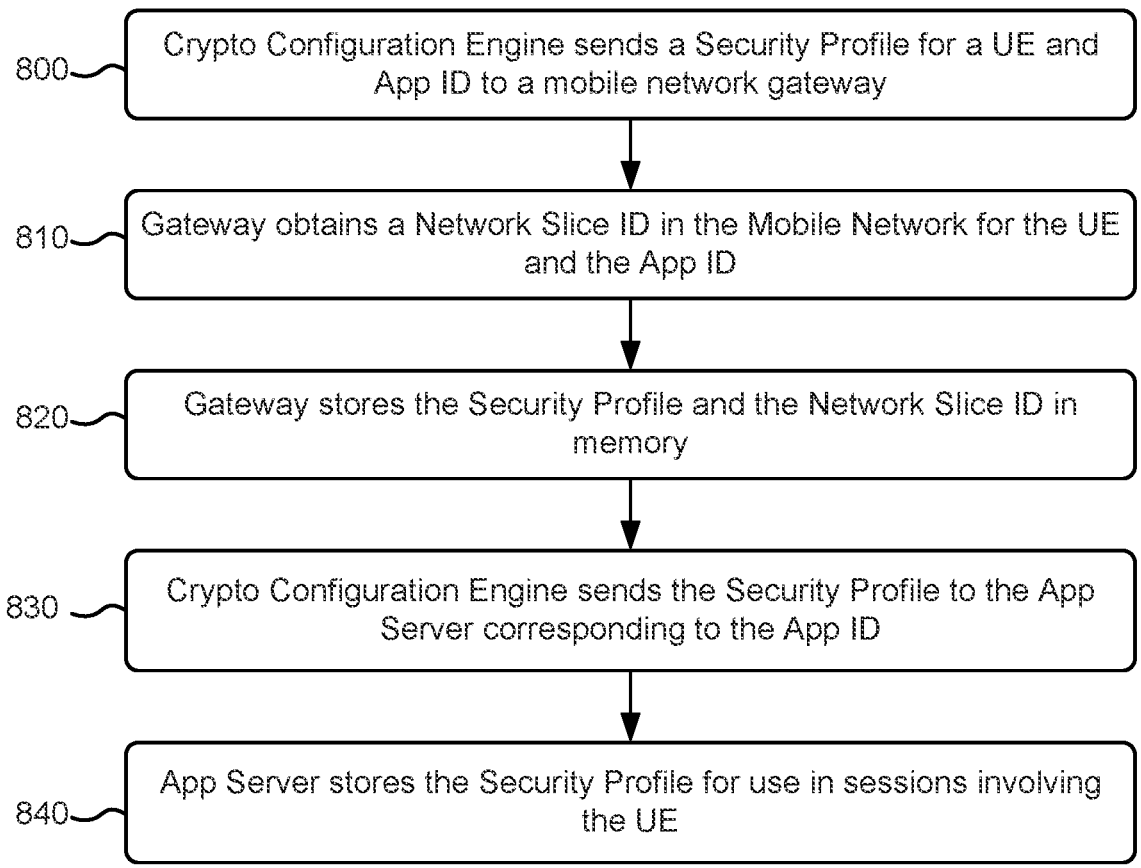
FIG. 8 is a flow diagram of an exemplary process for provisioning a security profile for a user equipment device and an application identifier to a gateway of the mobile network, and to an application server, of FIG. 1 for subsequent use in PDU sessions involving the user equipment device.

FIG. 8 is a flow diagram of an exemplary process for provisioning a security profile for a particular UE 125 and application 150 to a gateway 145 of mobile network 105, and to an app server 140, for subsequent use in PDU sessions involving the UE 125 and app server 140. The exemplary process of FIG. 8 may be implemented by crypto configuration engine 130 in conjunction with a gateway 145 and an app server 140. The exemplary process of FIG. 8 is described below with reference to the messaging/operations diagram of FIG. 9.

Figure 9:
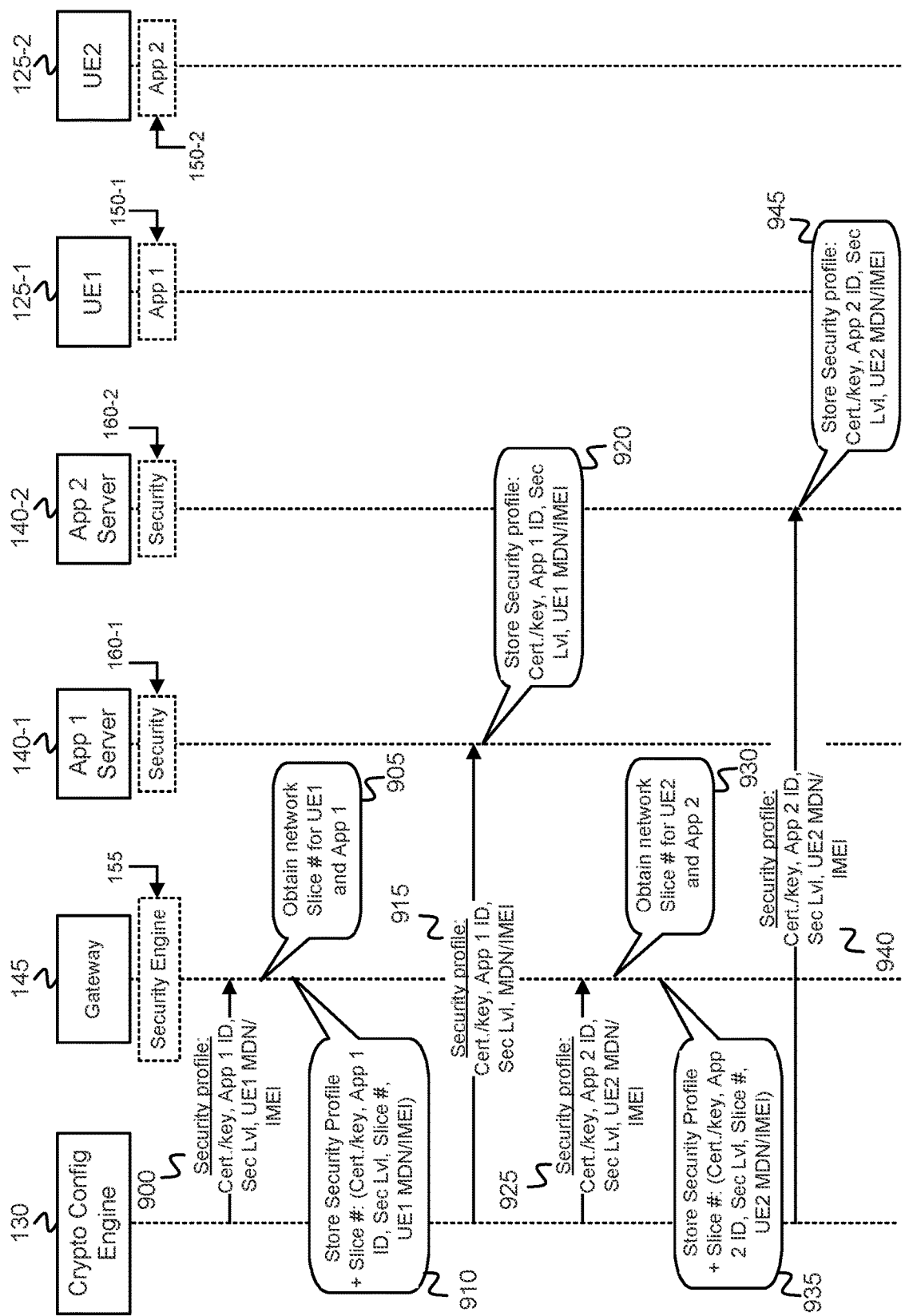
FIG. 9 is an exemplary messaging/operations diagram associated with the process of FIG. 8.

The exemplary process may include crypto configuration engine 130 sending a security profile for a UE 125 and app ID to a mobile network gateway 145 (block 800). Crypto configuration engine 130 identifies a gateway 145 currently serving a UE 125, and retrieves a security profile for the UE 125 and a particular application installed at the UE 125. For example, crypto configuration engine 130 may query security profile DB 135 to identify an entry 500 having data in field 510 that matches the UE 125's MDN and/or IMEI and having data in field 520 that matches the app ID of the particular application. Upon identification of the particular entry 500 with matching data, crypto configuration engine 130 retrieves the content of fields 510, 520, 540, and 550 of the entry 500 as the security profile for the UE 125 and the app ID. The security profile, thus, includes the UE 125's MDN/IMEI, the app ID, the certificate/key, and the customer-selected security level. FIG. 9 shows crypto configuration engine 130 sending a security profile 900 to gateway 145 for a first UE 125-1, where the security profile 900 includes a certificate/key, an app 1 ID associated with app 150-1, a security level, and a UE 1 MDN/IMEI. FIG. 9 additionally shows crypto configuration engine 130 sending a security profile 925 to gateway 145 for a second UE 125-2, where the security profile 925 includes a certificate/key, an app 2 ID associated with app 150-2, a security level, and a UE 2 MDN/IMEI.

Gateway 145 obtains a network slice ID in mobile network 105 for the UE 125 and the app ID (block 810). Mobile network 105 assigns a particular network slice to PDU sessions involving the UE 125 and the app ID of an app 150 to satisfy specific network service performance requirements (e.g., specific Service Level Agreements (SLAs)). The network service performance requirements may include, for example, latency, throughput, reliability, availability, and/or redundancy network service requirements. FIG. 9 shows gateway 145, upon receipt of the security profile 900 from crypto configuration engine 130, obtaining 905 a network slice number for the network slice that mobile network 105 has assigned for the UE 1 125-1 and app 1 150-1. FIG. 9 further shows gateway 145, upon receipt of the security profile 925 from crypto configuration engine 130, obtaining 930 a network slice number for the network slice that mobile network 105 has assigned for use by the traffic from the UE 2 125-2 and app 2 150-2.

Gateway 145 stores the security profile and the network slice ID in memory (block 820). Gateway 145 may store the security profile and the network slice ID in a locally stored version of security profile DB 135. For example, gateway 145 may store the UE 125's MDN/IMEI in field 510, the app ID in field 520, the network slice number in field 530, the certificate and/or key in field 540, and the security level in field 550 of an entry 500 of a locally stored data structure similar to that shown in FIG. 5. FIG. 9 depicts gateway 145 locally storing 910 the received security profile and the network slice number associated with UE 1 125-1, and locally storing 935 the received security profile and the network slice number associated with UE 2 125-2.

Crypto configuration engine 130 sends the security profile to the app server 140 corresponding to the app ID (block 830), and app server 140 stores the received security profile for use in sessions involving the UE 125 (block 840). Crypto configuration engine 130 identifies the app server 140 that acts as the server for the services provided by the application 150 associated with the app ID. Identification of the app server 140 may include, for example, identifying a network address (e.g., Internet Protocol (IP) address) of the app server 140. App server 140 may locally store the security profile and network slice ID in a data structure that is similar to that of security profile DB 135 shown in FIG. 5. FIG. 9 shows crypto configuration engine 130 sending a security profile 915 to app 1 server 140-1, where the security profile 915 includes a certificate/key, an app 1 ID, a security level, and a UE 1 MDN/IMEI, and app 1 server 140-1 locally storing 920 the received security profile and the network slice number associated with UE 1 125-1. FIG. 9 further shows crypto configuration engine 130 sending a security profile 940 to app 2 server 140-2, where the security profile 940 includes a certificate/key, an app 2 ID, a security level, and a UE 2 MDN/IMEI, and app 2 server 140-2 locally storing 945 the received security profile and the network slice number associated with UE 2 125-2.

Figure 10:
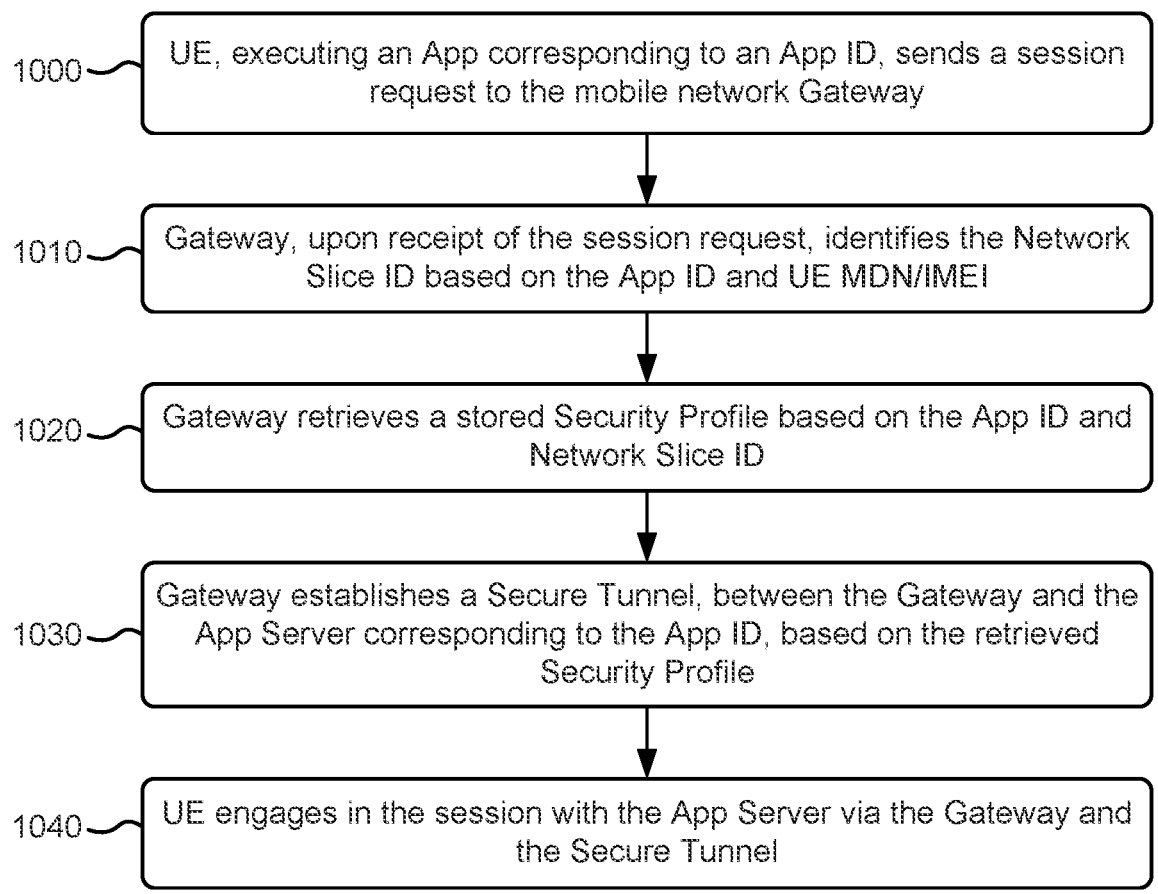
FIG. 10 is a flow diagram of an exemplary process for engaging in a packet data unit session via a secure tunnel established over a public network between a user equipment device and a session endpoint.

FIG. 10 is a flow diagram of an exemplary process for engaging in a PDU session via a secure tunnel established over a public network between a UE 125 and a session endpoint. The exemplary process of FIG. 10 may be implemented by a gateway 145, in conjunction with a UE 125 and a session endpoint (e.g., app server 140). The exemplary process of FIG. 10 is described below with reference to the messaging/operations diagram of FIG. 11.

Figure 11:
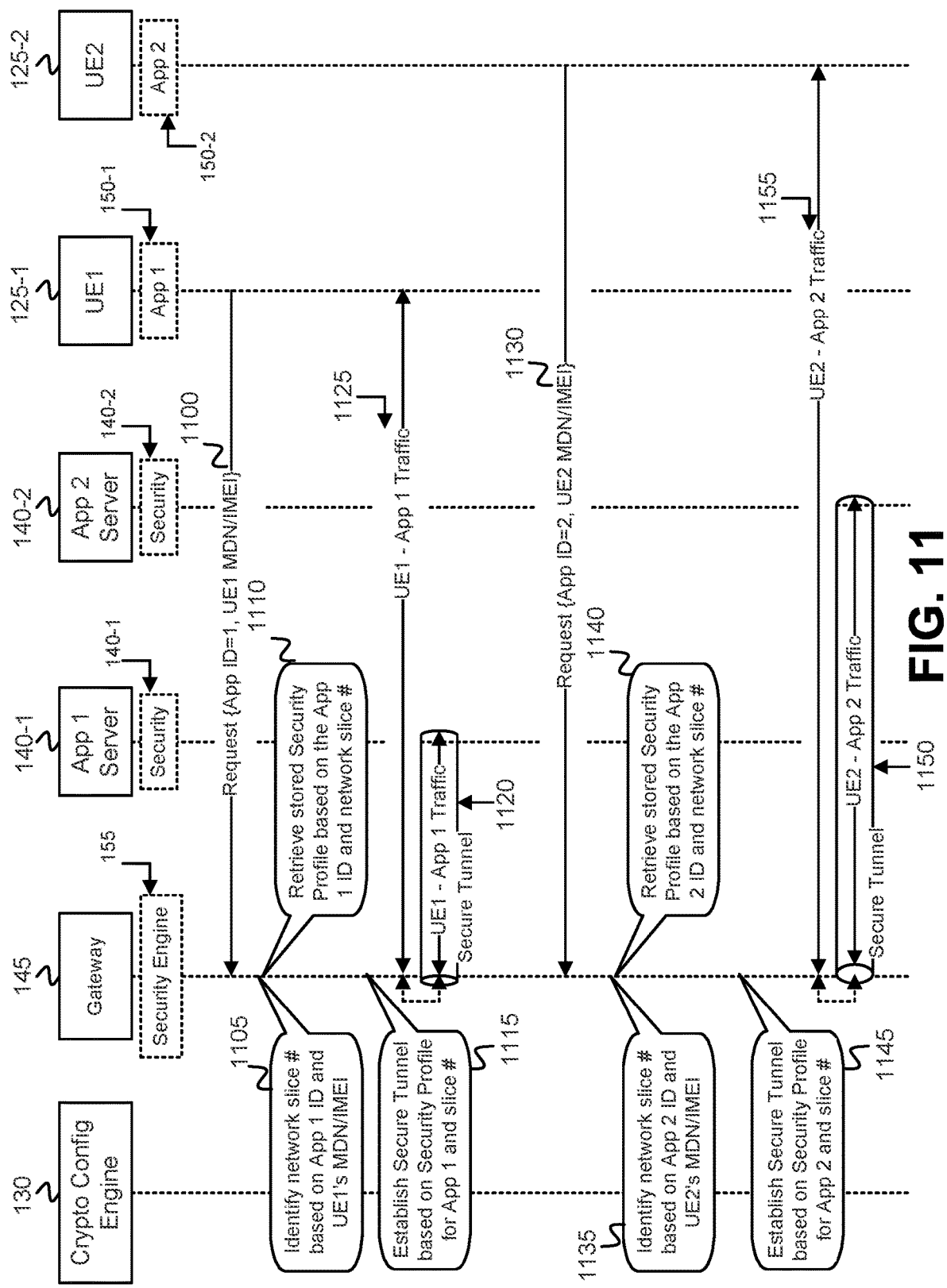
FIG. 11 is an exemplary messaging/operations diagram associated with the process of FIG. 10.

The exemplary process may include UE 125, executing an app 150 corresponding to an app ID, sending a session request to the mobile network gateway 145 (block 1000). In one implementation, a PDU of a particular session sent from UE 125 towards a destination app server 140 may represent a session request. The session PDU may include a UE ID, an app ID, and an identification of the destination app server 140 (e.g., a network address of the app server 140). In other implementations, messaging associated with a specific session request, that identifies the originating UE 125, the app ID, and the destination app server 140, may be sent from UE 125 across mobile network 105 to gateway 145. FIG. 11 shows UE 1 125-1 sending a session request 1100 to gateway 145 in mobile network 105, where the session request 1100 includes an app 1 ID and a MDN/IMEI associated with UE 1 125-1. FIG. 11 further shows UE 2 125-2 sending a session request 1130 to gateway 145 in mobile network 105, where the session request 1130 includes an app 2 ID and a MDN/IMEI associated with UE 2 125-2.

Gateway 145, upon receipt of the session request, identifies a network slice ID based on the app ID and the UE's MDN or IMEI (block 1010). Gateway 145 may retrieve a previously stored network slice ID (obtained in block 810 and stored in local memory in block 820 of FIG. 8). For example, referring to FIG. 5, gateway 145 may query the locally stored data structure with the UE's MDN and/or IMEI and the app ID to identify an entry 500 having matching data in fields 510 and 520. Gateway 145 may then retrieve the network slice ID stored in field 530 of the identified entry 500. FIG. 11 shows gateway 145, in response to session request 1100, identifying 1105 a network slice number in mobile network 105 based on the app 1 ID and the UE 1 125-1's MDN/IMEI. FIG. 11 further shows gateway 145, in response to session request 1130, identifying 1135 a network slice number in mobile network 105 based on the app 2 ID and the UE 2 125-2's MDN/IMEI.

Gateway 145 retrieves a stored security profile based on the app ID and the network slice ID (block 1020). Gateway 145 may retrieve data associated with a security profile for the UE 125 from an entry 500 of the locally stored data structure. For example, referring to FIG. 5, gateway 145 may query the locally stored data structure with the UE's MDN and/or IMEI, the app ID, and the network slice ID to identify an entry 500 having matching data in fields 510, 520, and 530. Gateway 145 may then retrieve security profile data, including a digital certificate and/or encryption key from field 540 and a security level from field 550, from the identified entry 500. FIG. 11 shows gateway 145 retrieving 1110 a stored security profile based on the app 1 ID and the network slice number associated with UE 1 125-1. FIG. 11 further shows gateway 145 retrieving 1140 a stored security profile based on the app 2 ID and the network slice number associated with UE 2 125-2.

Gateway 145 establishes a secure tunnel, between the gateway 145 and the app server 140 corresponding to the app ID, based on the retrieved security profile (block 1030). Gateway 145 identifies a data security, authentication, and/or cryptographic algorithm for use in establishing the secure tunnel based on the customer-selected security level from the security profile. Gateway 145 may, for example, encrypt outgoing PDUs of the session received from the UE 125, using the identified cryptographic algorithm and the retrieved digital certificate and/or encryption key, to create the secure tunnel from gateway 145 to the destination app server 140 corresponding to the app ID. FIG. 11 depicts gateway 145 establishing 1115 a secure tunnel 1120, for a PDU session involving UE 1 125-1 and app server 1 140-1, based on the security profile for app 1 150-1 and the identified network slice ID. FIG. 11 further depicts gateway 145 establishing 1145 a secure tunnel 1150, for a PDU session involving UE 2 125-2 and app server 2 140-2, based on the security profile for app 2 150-2 and the identified network slice number.

UE 125 engages in the session with the app server 140 via the gateway 145 and the secure tunnel (block 1040). App 150 of the UE 125 generates PDUs for the session and sends the PDUs across mobile network 105 to gateway 145. Gateway 145 encrypts the received PDUs and sends the encrypted PDUs via the secure tunnel across public network 110 (e.g., the Internet), and possibly a public network 115 or private network 120, to a destination app server 140. Gateway 145 additionally may receive encrypted PDUs for the session from the app server 140 via the secure tunnel, decrypt the PDUs, and forward the decrypted PDUs via mobile network 105 to the UE 125 engaged in the PDU session. The app server 140 may encrypt outgoing PDUs of the session with the UE 125 using the security profile previously distributed to app server 140 by crypto configuration engine 130. FIG. 11 depicts UE 1-app 1 traffic 1125 being sent from UE 125-1 to gateway 145, and then from gateway 145 to app server 140-1 via secure tunnel 1120, or in a reverse direction from app server 140-1 to gateway 145 via secure tunnel 1120, and then from gateway 145 to UE 125-1. FIG. 11 further depicts UE 2-app 2 traffic 1155 being sent from UE 125-2 to gateway 145, and then from gateway 145 to app server 140-2 via secure tunnel 1150, or in a reverse direction from app server 140-2 to gateway 145 via secure tunnel 1150, and then from gateway 145 to UE 125-2.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 8, and 10, and a sequence of operations, messages, and data flows with respect to FIGS. 9 and 11, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 415) of a device. A non-transitory storage medium includes one or more of the storage mediums described in relation to memory/storage 420. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying, by a network node residing in a mobile network, a first network slice of the mobile network for use by a first session between a first user equipment device (UE) and a first application hosted by a first hosting device;
   obtaining, by the network node, a first security profile based on an identity of the first application and based on the identified first network slice; and
   establishing, by the network node using the obtained first security profile, a first secure tunnel between the network node and the first hosting device for transporting first data units associated with the first session between the network node and the first hosting device.

2. The method of claim 1, further comprising:
   identifying, by the network node, a second network slice of the mobile network for use by a second session between a second UE and a second application hosted by a second hosting device;
   obtaining, by the network node, a second security profile based on an identity of the second application and based on the identified second network slice; and
   establishing, by the network node using the obtained second security profile, a second secure tunnel between the network node and the second hosting device for transporting second data units associated with the second session between the network node and the second hosting device.

3. The method of claim 1, further comprising:
   receiving from the first UE, by the network node, a first session request for the first session between the first UE and the first application hosted by the first hosting device, wherein the first session request includes a first application identifier (ID) that indicates the identity of the first application.

4. The method of claim 1, further comprising:
   transporting, by the network node, the first data units associated with the first session between the network node and the first hosting device via the first secure tunnel.

5. The method of claim 1, wherein the first security profile includes at least one key and wherein establishing the first secure tunnel between the network node and the first hosting device further comprises:
   encrypting a first portion of the first data units associated with the first session and received from the first UE, using the at least one key, for forwarding the encrypted first portion of the first data units via the first secure tunnel to the first hosting device; and
   decrypting a second portion of the first data units associated with the requested first session and received from the first hosting device via the first secure tunnel, using the at least one key, for forwarding to the first UE.

6. The method of claim 1, further comprising:
   receiving, by the network node from a configuration device, the first security profile, wherein the first security profile is configured by a network operator associated with the mobile network; an owner, operator, or administrator associated with the first hosting device; or an owner, operator, or administrator associated with the first UE; and storing, by the mobile network node, the first security profile in memory.

7. The method of claim 1, wherein the security profile includes a digital certificate or at least one key, a user selected security level, an application identifier (ID) that indicates the identity of the first application, and an ID associated with the first UE.

8. The method of claim 7, wherein the user selected security level indicates a level of security to be applied to the first secure tunnel.

9. The method of claim 7, wherein the user selected security level indicates one of a low, a medium, or a high level of security to be applied to the first secure tunnel.

10. The method of claim 9, wherein the low level of security comprises using one of Advanced Encryption Standard (AES) 126 or Message Digest algorithm 5 (MD5) to establish the first secure tunnel, wherein the medium level of security comprises using one of Rivest-Shamir-Adleman (RSA)-1024, Advanced Encryption Standard (AES) 512, or Secure Hash Algorithm (SHA)-1 to establish the first secure tunnel, and wherein the high level of security comprises using Elliptic-Curve Cryptography (ECC)-P256, Rivest-Shamir-Adleman (RSA)-2048, or Secure Hash Algorithm (SHA)-256 to establish the first secure tunnel.

11. A network device residing in a mobile network, comprising:

a memory configured to store a plurality of security profiles; and one or more processors, or logic, configured to:

identify a first network slice of the mobile network for use by a first session between a first user equipment device (UE) and a first application hosted by a first hosting device, obtain a first security profile, from the plurality of security profiles stored in the memory, based on an identity of the first application and based on the identified first network slice, and establish, using the obtained first security profile, a first secure tunnel between the network device and the first hosting device for transporting first data units associated with the first session between the network device and the first hosting device.

12. The network device of claim 11, wherein the one or more processors, or logic, is further configured to:

identify a second network slice of the mobile network for use by a second session between a second UE and a second application hosted by a second hosting device, obtain, from the plurality of security profiles stored in the memory, a second security profile based on an identity of the second application and based on the identified second network slice; and establish, using the obtained second security profile, a second secure tunnel between the network device and the second hosting device for transporting second data units associated with the second session between the network device and the second hosting device.

13. The network device of claim 11, further comprising:

a communication interface configured to receive from the first UE a first session request for the first session between the first UE and the first application hosted by the first hosting device, wherein the first session request includes a first application identifier (ID) that indicates the identity of the first application.

14. The network device of claim 11, wherein the one or more processors, or logic, is further configured to:

transport the first data units associated with the requested first session between the network device and the first hosting device via the first secure tunnel.

15. The network device of claim 11, wherein the first security profile includes at least one key and wherein, when establishing the first secure tunnel between the network device and the first hosting device, the one or more processors, or logic, is further configured to:

encrypt a first portion of the first data units associated with the first session and received from the first UE, using the at least one key, for forwarding the encrypted first portion of the first data units via the first secure tunnel to the first hosting device; and decrypt a second portion of the first data units associated with the requested first session and received from the first hosting device via the first secure tunnel, using the at least one key, for forwarding to the first UE.

16. The network device of claim 11, wherein the security profile includes a digital certificate or at least one key, a user selected security level, an application identifier (ID) that indicates the identity of the first application, and an ID associated with the first UE.

17. The network device of claim 16, wherein the user selected security level indicates one of a low, a medium, or a high level of security to be applied to the secure tunnel.

18. The network device of claim 17, wherein the low level of security comprises using one of Advanced Encryption Standard (AES) 126 or Message Digest algorithm 5 (MD5) to establish the first secure tunnel, wherein the medium level of security comprises using one of Rivest-Shamir-Adleman (RSA)-1024, Advanced Encryption Standard (AES) 512, or Secure Hash Algorithm (SHA)-1 to establish the first secure tunnel, and wherein the high level of security comprises using Elliptic-Curve Cryptography (ECC)-P256, Rivest-Shamir-Adleman (RSA)-2048, or Secure Hash Algorithm (SHA)-256 to establish the first secure tunnel.

19. A non-transitory storage medium storing instructions executable by a network device, residing in a mobile network, with one or more processors, wherein execution of the instructions causes the network device to:

identify a first network slice of the mobile network for use by a first session between a first user equipment device (UE) and a first application hosted by a first hosting device;

obtain a first security profile based on an identity of the first application and based on the identified first network slice; and establish, using the obtained first security profile, a first secure tunnel between the network device and the first hosting device for transporting first data units associated with the first session between the network device and the first hosting device.

20. The non-transitory storage medium of claim 19, wherein the security profile includes a digital certificate or at least one key, a user selected security level, an application identifier (ID) that indicates the identity of the first application, and an ID associated with the first UE, and wherein the user selected security level indicates one of multiple levels of security to be applied to the first secure tunnel.

* * * * *